United States Patent [19]

McDonald

[11] Patent Number: 5,560,156
[45] Date of Patent: Oct. 1, 1996

[54] HURRICANE TIE-DOWN

[76] Inventor: Kenneth O. McDonald, 602 Midwood Dr., Plant City, Fla. 33567

[21] Appl. No.: 509,574

[22] Filed: Jul. 31, 1995

[51] Int. Cl.$^6$ .................................. E04B 1/38; F16B 1/00
[52] U.S. Cl. .................. 52/92.2; 52/712; 52/715; 52/746.11; 403/232.1
[58] Field of Search .................. 52/712, 715, 92.2, 52/745.21, 746.11; 403/386, 232.1

[56] References Cited

U.S. PATENT DOCUMENTS

| | | | |
|---|---|---|---|
| 1,406,723 | 2/1922 | Caldwell | 403/232.1 |
| 3,972,169 | 8/1976 | Sheppard, Jr. | 52/715 X |
| 4,022,537 | 5/1977 | Gilb et al. | 52/715 X |
| 4,411,548 | 10/1983 | Tschan | 403/232.1 |
| 4,527,375 | 7/1985 | Braginetz | 52/712 |
| 4,592,186 | 6/1986 | Branginetz | 52/715 X |
| 4,713,923 | 12/1987 | Sielaff et al. | 52/92.2 X |
| 4,841,690 | 6/1989 | Commins | 52/712 X |
| 5,109,646 | 5/1992 | Colonias et al. | 52/712 |
| 5,150,982 | 9/1992 | Gilb | 52/712 X |
| 5,423,156 | 6/1995 | Hellessen, Jr. | 52/715 |

*Primary Examiner*—Wynn E. Wood
*Attorney, Agent, or Firm*—James F. Cottone

[57] ABSTRACT

An improved hurricane tie-down member is formed of a unitary flat metallic preform to restrain roof trusses experiencing high wind conditions by optimally transferring dynamic roof uplift forces from a planar saddle portion to a vertical wall via a pair of side arm members and flat anchor surfaces. In a preferred embodiment, over Kips of shear resistance is provided per tie-down member, and when used in sets of four tie-downs, a highly effective method for pitched roof protection is provided.

13 Claims, 1 Drawing Sheet

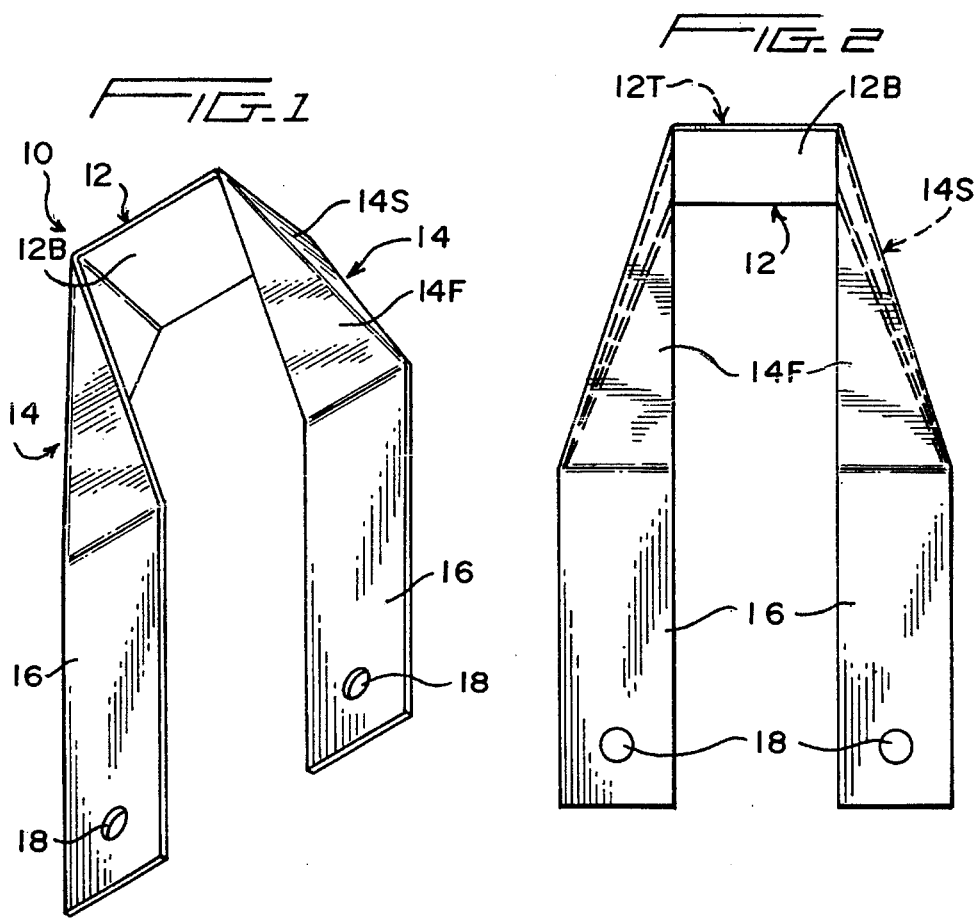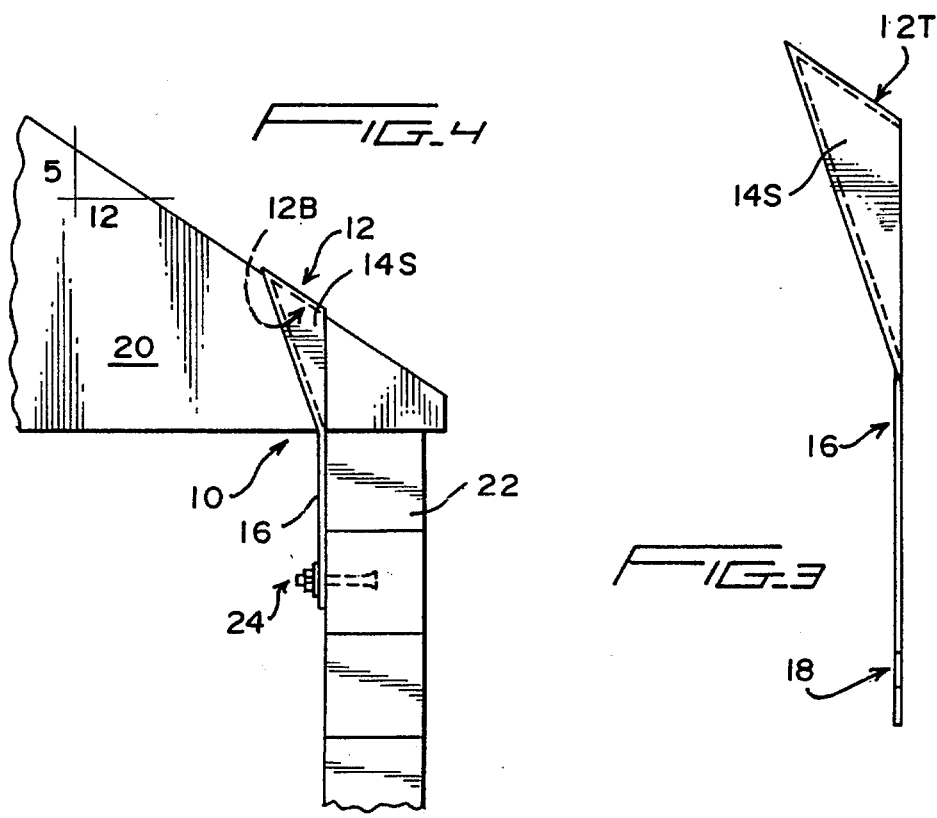

HURRICANE TIE-DOWN

BACKGROUND OF THE INVENTION

1. Field of the Invention

The present invention relates generally to strengthening members for use in retaining building roofs, and in particular to a tie-down member specially configured to restrain roof trusses under heavy wind conditions as encountered in hurricane prone regions.

2. Description of the Prior Art

Methods and apparatus for providing metallic strengthening and interconnecting elements for use with wooden building components have a long history of development. Craftsmen and tradesmen in the construction field have directed a good deal of attention to families of interconnecting devices including joist hangers, stud holders, and brackets of all types. Upon close review, however, the greatest majority of prior art teachings in this area are directed to brackets and hangers adapted to operate against static gravity loads. The straightforward requirements of supporting more or less constant gravity-induced loads have produced a number of well-known and widely used devices. The problems associated with dynamically induced uplift forces in buildings—especially those with pitched roofs—have not been adequately addressed by prior art devices. This fact is attested to by the severe property losses experienced regularly in regions of the country that are subjected to seasonal wind storms or recurring hurricane conditions.

Descriptions of typical prior art approaches to the roof uplift problem may be found in a number of U.S. patents. Illustrative early teachings of metallic members used to tie down roof rafters are found in U.S. Pat. Nos. 1,277,766 to Stadelman and 1,657,441 to Huovinen. In the 1918 '766 patent, a simple wrought iron strap (single length, quarter-turn twist) is bolted to a vertical wall member at a lower end and to a rafter at an upper end as a 'preferred means' of connection between the roof and siding. The 1928 '441 patent shows the use of a pair of similar metallic strap-like members bolted to each rafter just above where they meet a masonry block wall, the straps continuing downward through the courses of block to ultimately be anchored in a concrete footing.

An even earlier teaching of a two-part metallic member used to fasten upright posts to rafters is provided in U.S. Pat. No. 1,179,785 issued in 1916 to Walker. In this patent, each of two mirror image metal bars are riveted to opposite sides of the post tops and extend over the top of a rafter to meet clam-shell like at the rafter top surface.

A more recent teaching of retaining rafters in a pole barn is found in U.S. Pat. No. 2,843,085 issued in 1958 to McKee. No substantive details on the structure of the strap iron member are found, and from the drawing it appears to be a simple wrap-around and nail-down device.

Present-day approaches to this critical area continue to be largely ad hoc and vary widely between seriously underestimating the dynamic requirements involved, and using greatly over-designed, brute force tie-downs. Consider the more or less contemporary approach found in U.S. Pat. No. 4,478,018 to Holland. Specifically reciting hurricane requirements for restraining roof structures, steel straps riveted to metallic top channels positioned over the entire length of vertical walls are employed. Other contemporary approaches alternatively employ L-shaped brackets of ⅜-inch steel, the brackets held to the roof trusses by an unseemly large number of nails.

Clearly, current approaches to securing roofs to their associated buildings continue to reflect a lack of appreciation for this critical task. In those areas of the country where hurricane-level winds occur, the failure of roof truss anchoring means is dramatically seen on a year-after-year basis.

Therefore, the improved hurricane tie-down member as taught in the present invention admirably addresses the roof truss uplift problems associated with pitched roofs and provides significant benefits in this usage while retaining all of the desirable low-cost and simple-to-use attributes.

SUMMARY OF THE INVENTION

It is therefore a primary object of the present invention to provide an improved hurricane tie-down member for countering the uplift forces induced in roof trusses, and one that will overcome the disadvantages of the prior art methods and devices.

A further object of the present invention is to provide a tie-down device simply formed as a unitary member bent to optimally restrain uplift forces on a roof truss positioned beneath its saddle by transferring the highly variable vertical dynamic forces to a vertical wall.

A still further object of the present invention is to provide a hurricane tie-down member specifically configured and sized to provide quantifiable uplift force restraining characteristics by means of specifically recited material types described according to well-known and accepted scientific and commercial standards.

The yet further object of the present invention is to provide a method for anchoring a building roof having a pitch determined by a number of roof trusses by using a plurality of tie-down members—typically, at least four—formed according to the present invention.

In a preferred embodiment, a hurricane tie-down member is formed from a unitary flat metallic preform to restrain an upper surface of its associated roof truss by means of a planar saddle portion. The saddle portion transfers any upward forces to a vertical load bearing wall via a pair of intermediately positioned side arm members that terminate at their lower ends in flat anchor surfaces—which in turn mate with and are anchored to the vertical wall.

BRIEF DESCRIPTION OF THE DRAWINGS

Additional objects and advantages of the invention will become apparent to those skilled in the art as the description proceeds with reference to the accompanying drawings wherein:

FIG. 1 is a bottom front perspective view of an improved hurricane tie-down member according to the present invention;

FIG. 2 is a front elevational view of the tie-down of FIG. 1;

FIG. 3 is a side elevational view of the tie-down of FIG. 1; and

FIG. 4 is a highly schematic side view (partly in phantom) of the improved hurricane tie-down in use retaining a roof truss to a masonry wall.

DETAILED DESCRIPTION OF THE PREFERRED EMBODIMENTS

Referring now to FIG. 1 there is shown a perspective view of a hurricane tie-down member according to the present invention. By way of a brief overview, a tie-down member 10 is formed from a single piece of flat sheet metal bent to include a top saddle portion 12 interconnected via a pair of intermediate side-arm members 14 to a corresponding pair of wall- anchor surfaces 16. Each wall anchor surface 16 includes a bolt hole 18 near its lower end to accommodate a stud or other horizontally disposed fastening means (shown as an anchor bolt in FIG. 4) which serves to anchor the tie-down 10 to a vertical wall.

FIGS. 2 and 3 show front and side elevational views of the tie-down member 10 with clearer expositions of bottom and top surfaces of saddle portion 12 as 12B and 12T, respectively, and front and side facets of bent side arm members 14 as 14F and 14S, respectively. Considering the several views provided in FIGS. 1–3, it may be noted that the anchor surfaces 16 depend from their corresponding side arm members 14 via bends formed to include an obtuse angle between surfaces 14F and the inside surface of the anchor surfaces 16. The bends delineating the saddle portion 12 from the side arm members 14 include obtuse angles between surface 12B and surfaces 14S, while the dual-faceted side arm members 14 include a diagonal top-to-bottom bend to form the front facet 14F and side facet 14S.

Whereas previously known tie-down members have been formed from whatever metallic materials were conveniently at hand, and generally provided either unknown, marginal, or highly over-designed restraint on their associated roof trusses or rafters, the present tie-down is specifically configured to provide a tie-down member accurately sized to meet actual needs while maintaining low costs and high effectiveness. This is especially the case where newly enacted requirements in certain states now specify the number (and possibly overall strengths) of tie-downs to be used in homes being built or refurbished in hurricane-prone regions of the country. In structural terms, the improved tie-down 10 is formed from a unitary preform stamped from 16-gage sheet steel metal as a flat, somewhat V-shaped blank. The side arm members optimally transfer the significant upward forces—which are highly variable and which may peak at levels of several thousand pounds, hereinafter expressed in Kips (thousands of pounds)—to their vertical walls, which are typically made of masonry. The tie-down 10 is pictured in FIG. 1 as it would be seen by an upward-looking observer located near an interior wall of the protected building.

FIG. 4 shows a typical installation of the improved hurricane tie-down used to restrain a roof truss 20 to a vertical wall 22. For simplicity of exposition, the view shown is highly schematic and includes partial fragmentation of selected elements. The tie-down 10 is positioned over the roof truss 20 before roofing is applied such that the bottom surface 12B of saddle portion 12 mates snugly with the upper pitched surface of the truss 20. While in such contact, the tie-down 10 is slid slightly uphill or downhill along the truss to ensure full surface contact between an outside facing surface of anchor surface 16 and an inside surface of a vertical wall 22. The vertical wall 22 may be made of poured concrete, cement block, or similar well-known masonry materials, and is typically a load-bearing wall. In a preferred embodiment, a ⅝-inch expansion bolt suitably embedded into the masonry wall 22 secures both bottom ends of the wall anchor surfaces 16 to the wall via the bolt holes 18, all as shown generally by the fastening means arrangement at 24. Other conventional techniques for securing anchor surfaces 16 to the wall 22 are contemplated, including the use of dual-bolt/stud anchoring means, lag bolts, or threaded bolts—any of which may be urged into deformable or threaded sleeves inserted into holes in the masonry wall and secured by material deformation, adhesives and the like.

For typical residential building roofs, a model KM-7 hurricane tie-down according to the present invention, available from Steel Fabricators, Inc. of Plant City, Fla. 33564, fulfills known hurricane tie-down requirements when used in mandated sets of four per roof. For these applications, over 11 Kips of shear strength is achieved by that particular model of tie-down made of 16-gage steel (type ASTM A-525) when properly anchored by a pair of ⅝-inch bolts of type ASTM A-325 steel in 4,000-psi rated concrete. When so secured, the bolts exhibit a pull-out test of over 13 Kips per bolt. For extended long life, the tie-down 10 may be galvanized coated, and the relative sizes of the three primary tie-down portions may be adjusted to meet specific end usages.

Although the invention has been described in terms of selected preferred embodiments, the invention should not be deemed limited thereto since other embodiments and modifications will readily occur to one skilled in the art. For example, the illustrative usage of FIG. 4 shows the improved tie-down configured for use with roof trusses of a particular pitch (5 rise in 12 run). The full range of normally encountered roof pitches are, of course, contemplated, as are other minor variants such as employing more than one bolt hole per anchor surface if quantitatively called for. It is therefore to be understood that the appended claims are intended to cover all such modifications as fall within the true spirit and scope of the invention.

What is claimed is:

1. A roof truss tie-down member formed from a unitary flat metallic preform comprising:
   (a) a planar saddle portion centrally positioned between a pair of side arm members for restraining uplift forces developed by a roof truss retained beneath said saddle;
   (b) a pair of flat anchor surfaces, each of said pair depending from one of said pair of side arm members at an abtuse angle for securing both ends of said tie-down to a vertical wall surface supporting said roof truss; and
   (c) said side arm members depending from said saddle at obtuse angles to serve as uplift force transfer members between said saddle and said anchor surfaces, each of said side arm members formed via a diagonal bend to include dual facets oriented at acute angles, an upper end of a first facet oriented at an obtuse angle with said saddle, and a lower end of a second facet oriented at an obtuse angle with said anchor surface.

2. The tie-down of claim 1 wherein each of said anchor surfaces is secured to said vertical wall surface by at least one bolt routed through an aperture near a lower end of said anchor surface, said bolt providing at least 10 Kips of shear resistance between said vertical wall and anchor surfaces.

3. The tie-down of claim 2 wherein said bolt is at least ⅝ inch in diameter and provides greater than 13 Kips pull-out force when embedded in a concrete vertical wall.

4. The tie-down of claim 3 wherein said tie-down is galvanized coated.

5. The tie-down of claim 2 wherein each of said anchor surfaces is secured to said vertical wall by two or more bolt holes formed near a lower end of each anchor surface.

6. The tie-down of claim 1 wherein said obtuse angles of said upper ends of said pair of side arm members are equal and adopted to position the plane of said saddle at an angle equal to the roof pitch imparted by said roof truss.

7. The tie-down of claim 6 wherein said roof pitch is defined by a rise of 5 units in a run of 12 units.

8. The tie-down of claim 1, further comprising a roof dress, wherein said roof truss is made of wood and includes a horizontal lower surface adapted to rest on a load-bearing vertical masonry wall.

9. A method for anchoring a building roof, having a pitch determined by a plurality of roof truss members, to a supporting vertical wall, comprising:

(a) providing at least four roof truss tie-down members for individually restraining the uplift forces of a like number of roof trusses, each tie-down formed from a unitary flat metallic preform having a planar saddle portion centrally positioned at an upper end between a pair of side arm members each of which terminates in an associated flat anchor surface at its lower end;

(b) each tie-down serving to restrain uplift forces developed by its associated roof truss when retained beneath said saddle and each tie-down has its central saddle portion delineated from its side arm members by bends at first obtuse angles and its side arm members delineated from its anchor surfaces by bends at second obtuse angles, said first obtuse angles positioning the plane of said saddle at an angle equal to said roof pitch;

(c) said anchor surfaces serving to secure both lower ends of each tie-down flush to a vertical wall by a fastening means that passes through an opening in each anchor surface and is horizontally affixed into said wall; and (d) said pair of side arm members positioned intermediate said saddle and anchor surfaces for transferring said uplift forces from said saddle to a vertical wall via said anchor surfaces.

10. The method of claim 9 comprising the further step of forming at least one opening in a lower end of each anchor surface and correspondingly positioned openings in a vertical wall to accept at least one horizontally disposed anchor bolt as said fastening means for providing a predetermined amount of shear resistance between said tie-down and a vertical wall to counter said uplift forces.

11. The method of claim 10 comprising the further step of providing said metallic preforms from 16-gage galvanized steel.

12. The method of claim 11 comprising the further step of providing said at least one anchor bolt in a ⅝-inch diameter.

13. The method of claim 12 comprising the further step of providing said metallic preform from steel to produce greater than 6 Kips of shear strength when properly embedded in a concrete vertical wall.

* * * * *